United States Patent [19]

Trintignac et al.

[11] Patent Number: 4,549,468

[45] Date of Patent: Oct. 29, 1985

[54] HYDRAULIC CONTROL DEVICE, PARTICULARLY FOR POWER STEERING

[75] Inventors: Christian Trintignac, Nogent sur Marne; Jean-Claude Jaccod, Champigny, both of France

[73] Assignee: Regie Nationale des Usines Renault, Boulogne-Billancourt, France

[21] Appl. No.: 575,987

[22] Filed: Feb. 1, 1984

[30] Foreign Application Priority Data

Feb. 1, 1983 [FR] France .................. 83 01522

[51] Int. Cl.⁴ .................................... F01B 25/26
[52] U.S. Cl. ........................ 91/361; 91/459; 180/132
[58] Field of Search ............ 91/459, 361; 180/132

[56] References Cited

U.S. PATENT DOCUMENTS 3,987,702 10/1976 Boss et al. ................... 91/459

FOREIGN PATENT DOCUMENTS

| 1276473 | 8/1968 | Fed. Rep. of Germany ........ 91/459 |
| 2946274 | 11/1979 | Fed. Rep. of Germany . |
| 2188074 | 1/1974 | France . |
| 2205875 | 5/1974 | France . |
| 2321417 | 8/1975 | France . |

Primary Examiner—Robert E. Garrett
Assistant Examiner—John M. Husar
Attorney, Agent, or Firm—Oblon, Fisher, Spivak, McClelland & Maier

[57] ABSTRACT

The slide (61) of an electrohydraulic valve (31) delimits two end chambers (57, 58) respectively fed by a control pressure that is a slave to the open or closed state of one of the two solenoid valves (51, 52) controlled by signals processed by an electronic control (50) and the establishment of a state acts on the slide (61) in direction of a throttling of the delivery which causes a feed channel of the valve (31) and a working line (27, 28) from a pump (1) to communicate with the line (70) for connection with the fluid tank (2).

2 Claims, 3 Drawing Figures

HYDRAULIC CONTROL DEVICE, PARTICULARLY FOR POWER STEERING

FIELD OF THE INVENTION

This invention relates to a hydraulic control device, particularly for power steering, comprising a distributor that communicates respectively, by two working lines, with one or other of the two chambers of a double-action jack and, by a connecting line, with a tank and which comprises a slide drawn into a neutral position by the delivery pressure of a pump.

BACKGROUND OF THE INVENTION

According to an arrangement known from French Pat. No. 2 321 417, the distributor, which can be a slide valve or turning valve, is sensitive to the application of a torque to the steering shaft to create a pressure difference between the two chambers of the jack and to produce a booster force which is transmitted to the rack to facilitate operation of the steering of the vehicle by the steering shaft and the driving pinion of the rack.

When no torque is applied to the steering shaft, the valve is in rest position and the pressure is the same in both chambers of the jack which corresponds to a booster force having a zero value.

According to an arrangement known from French Pat. No. 2 470 883, the distributor slide is also drawn toward its neutral position by the pressure prevailing in the two control chambers each of which is in communication with the line of a control pump, which can be adjusted by a manually operated unit, and by a nonreturn valve system, with a main pump.

To increase the response time of the jack, and arrangement of the distributor slide provides throttling passages which make a control chamber of the slide communicate with the supply line of the jack and with the line connecting the distributor to the tank.

Other types of power steering reduce the booster rate at high speeds or make the boost act only in a range of low speeds or during parking maneuvers. Steering known from French Pat. No. 2 434 744 receives a boost in a range of set speeds and uses an electronic control for processing signals produced by speed and torque sensors. The electronic control will advantageously have a computer and microprocess structure which will be able to perform multiple functions from a specific program.

SUMMARY OF THE INVENTION

For this purpose, the distributor will be of the electrohydraulic type having a slide that is mobile in a valve body which, with this body, delimits two end chambers respectively fed by a control pressure that is a slave to the open or closed state of one of the two solenoid valves controlled by the signals processed by the electronic control. Establishment of one of the states acts on the slide in the direction of throttling of the delivery which makes a supply channel and a working line from the pump communicate with a line connecting the distributor to the tank.

According to a particularly simple embodiment, two annular grooves are provided to form throttling passages. The grooves are made on the periphery of the slide and are limited by two axially spaced shoulders which are able to throttle the fluid between a channel for feeding the distributor and the line for connection with the tank.

BRIEF DESCRIPTION OF THE DRAWINGS

The invention will now be described with reference to the drawing in which.

DETAILED DESCRIPTION OF THE PRESENTLY PREFERRED EMBODIMENT

Figure 1:
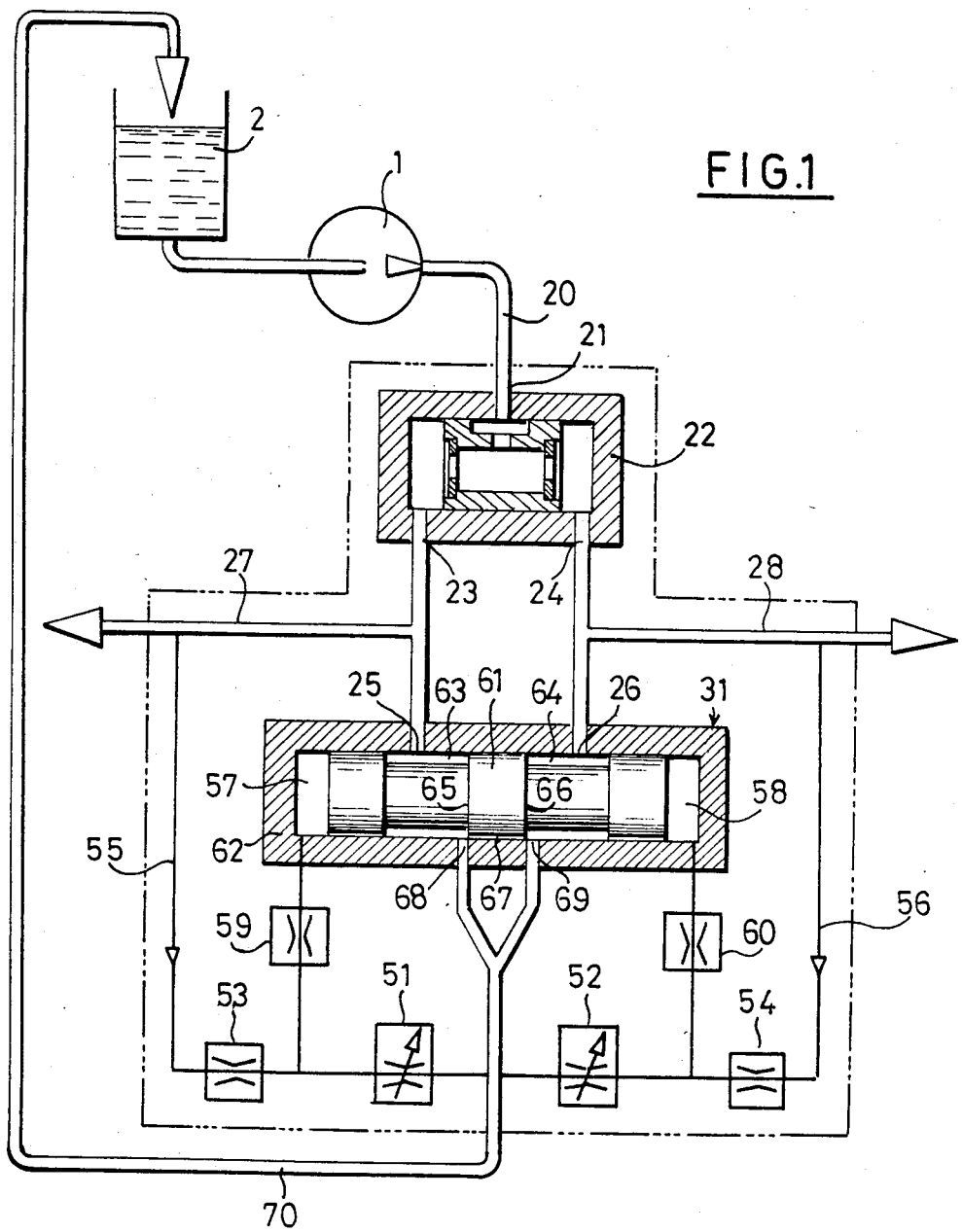
FIG. 1 is a diagrammatic representation of the hydraulic control device.
Figure 2:
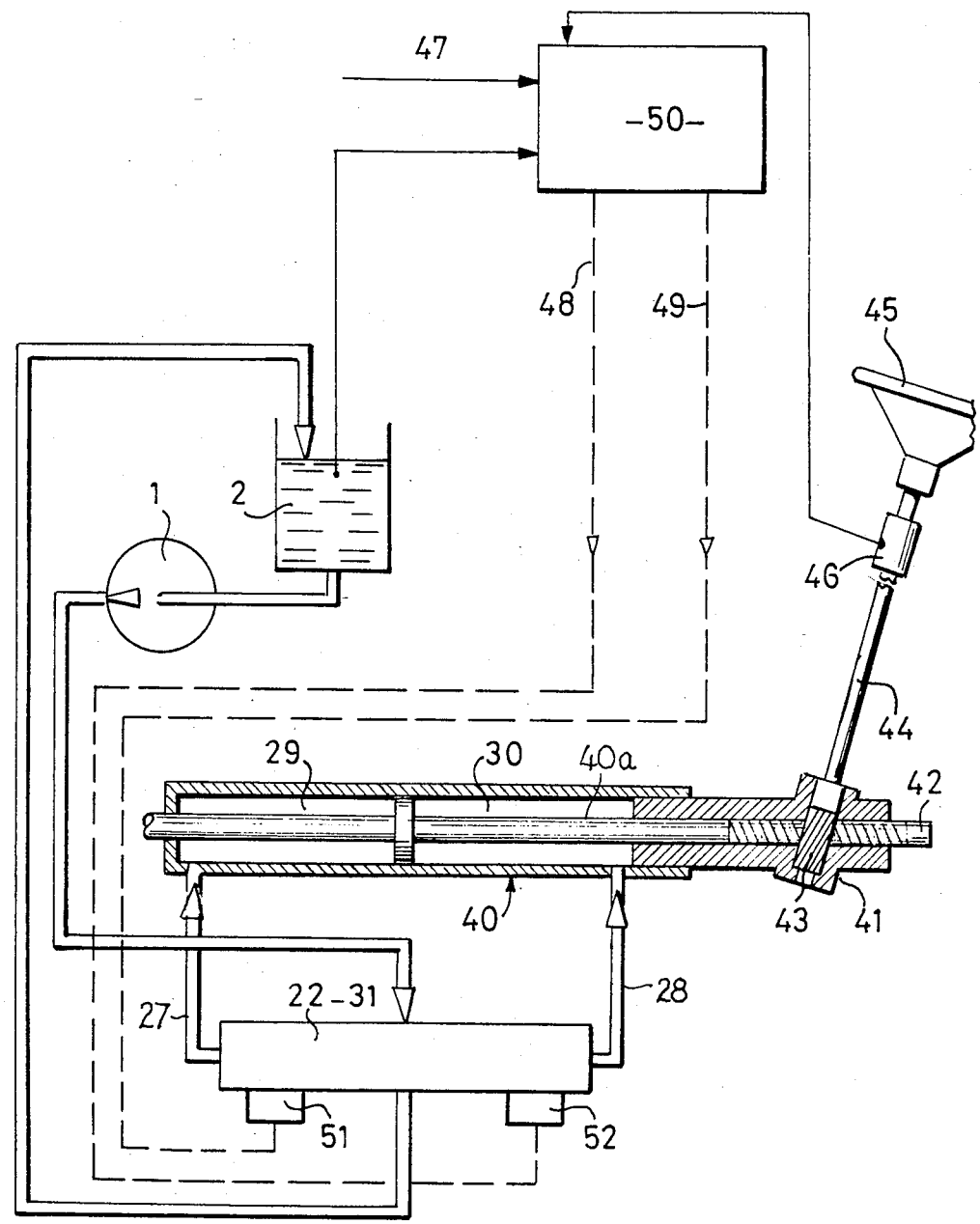
FIG. 2 is a diagrammatic representation of the power steering using the device.

The device shown in FIGS. 1 and 2 comprises a constant-flow pump 1 which conveys the hydraulic fluid from a tank 2. The output orifice of the pump is connected by a line 20 to intake orifice 21 of a delivery divider 22 having output orifices 23, 24 between which the fluid is divided. Output orifice 23 communicates with intake orifice 25 of the electrohydraulic distributor or valve 31 and with a working line 27 connected to chamber 29 of a double-action jack 40. Also, orifice 24 communicates with another intake orifice 26 of distributor 31 and with a working line 28 connected to the other chamber 30 of jack 40.

As is known, jack 40 is part of a steering gear box 41 in which rack 42, mounted at the end of the rod 40a of jack 40, moves. Rack 42 meshes with its driving pinion 43 mounted on the end of a steering shaft 44 operated by a steering wheel 45. Steering shaft 44 carries a torque sensor 46 which delivers signals to an electronic processing control 50. Electronic processing control 50 can also receive information on the oil temperature and vehicle speed brought by the input channels and coming from temperature sensors and tachometric sensor or others to begin processing of the output signals for control of the solenoid valves of distributor 31 when the vehicle travels, for example at less than 5 km/h, and when the oil has optimal viscosity. In this speed range, which is usually that of parking maneuvers, a signal produced in torque sensor 46 during turning of the steering shaft 44 causes, at the output of electronic control 50, a control pulse that comes by one of the output channels 48, 49 to one or other of the electrically controlled solenoid valves or regulators 51, 52, which have adjustable delivery and are normally closed in the absence of control voltage. Regulators 51, 52, having adjustable delivery, are put into a hydraulic control circuit placed between two regulators 53, 54, having a fixed delivery, which are respectively fed by a control line 55, 56 connected to working line 27, 28. Adjustable-delivery regulators 51, 52, connected to line 70 for connection with tank 2, are placed respectively in parallel with two control chambers 57, 58, which are limited by the ends of slide 61 and fed through delivery regulators 59, 60. Slide 61, which is mobile in body 62 of distributor 31, has two annular grooves 63, 64 on its periphery which are respectively limited by two shoulders 65, 66 axially separated by a bearing surface 67. Body 62 of the distributor has two working orifices 68, 69 which respectively come out in grooves 63, 64 in contact with shoulder 65, 66. Working orifices 68, 69 are respectively connected by line 70 to tank 2.

The operation of the hydraulic control will appear from studying FIG. 1.

If steering wheel 45 is turned, torque sensor 46 sends information $U_1$ or $U_2$ to electronic processing control 50 which produces a signal for control of regulator 51 or 52 depending on the desired direction of steering lock.

Let us assume that the signal controls regulator 51 and that regulator 52 remains closed. The delivery in control line 56 is zero. The pressure in control chamber 58 is equal to the loss of pressure through orifice 69. Opening of regulator 51 creates a delivery in control line 55.

Slide 61 is out of balance and moves to the left of the figure because of a pressure drop in control chamber 57 caused by opening of regulator 51.

Throttling of the hydraulic fluid therefore increases through working orifice 68 which is partially (or totally) blocked. With the pressure in working line 27 then increasing, the pressure and therefore the delivery also increase in control line 55. When the pressure in control chamber 57, due to throttling of the fluid through regulator 51, again becomes equal to the pressure in control chamber 58, slide 61 is again in balance. There is then a second state of balance for which there is a booster pressure in chamber 29 of the jack.

Figure 3:
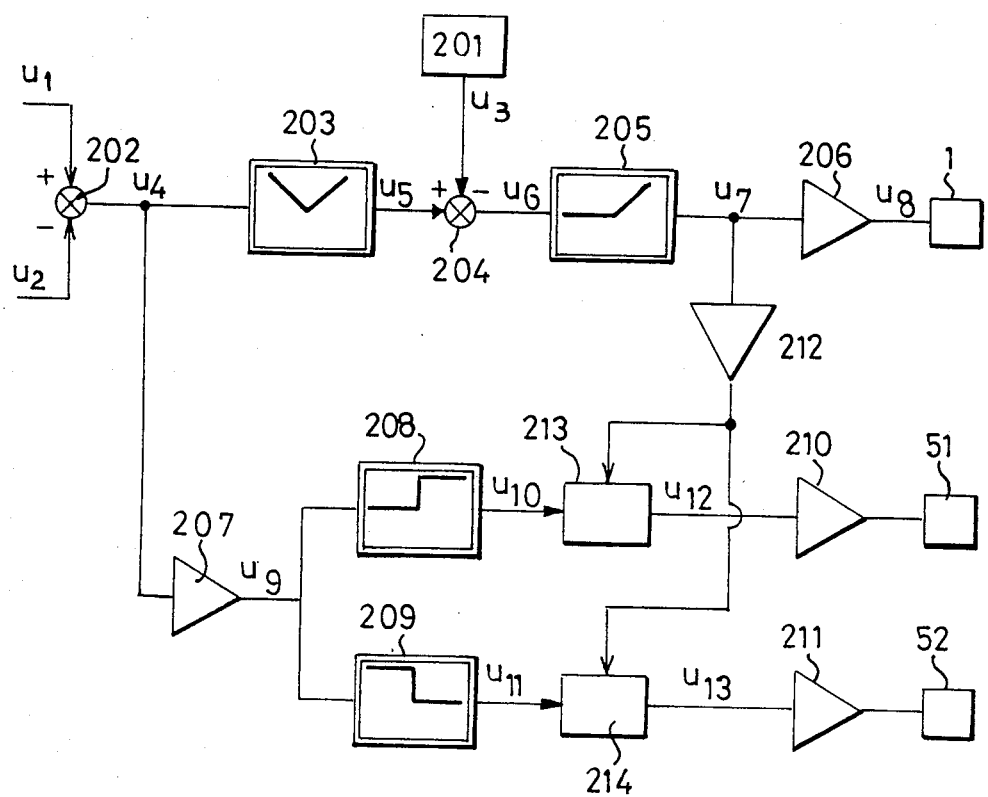
FIG. 3 represents an embodiment of the electronic control.

It will be noted that in case of an outage of electronic control 50, regulators 51 and 52 are closed; consequently, slide 61 remains in balance. Jack 40 remains out of action and the steering mechanism does not receive any boost. FIG. 3 shows in greater detail the control that makes it possible to perform the following operations:

on the one hand, to produce, from information $U_1$ and $U_2$ delivered by the torque sensor depending on the direction of the turning of the steering wheel, an electric pressure control signal that is at least a function of the vehicle speed supplied by a sensor 201 sending a voltage $U_3$ as a function of speed;

on the other hand, from information $U_1$ and $U_2$, to process signals for control of the windings of regulators 51, 52 for selection of the direction of application of the booster pressure.

Voltages $U_1$ and $U_2$ are therefore placed in opposition without a comparator 202 whose output voltage $U_4$ is admitted at the input of a network 203 charged with processing an output voltage $U_5$ equal to the absolute value of the difference between voltages $U_1$ and $U_2$: it therefore is the image of the magnitude of the torque applied to the steering wheel by the driver.

This voltage $U_5$ is compared by a unit 204 with voltage $U_3$ sent by at least a speed sensor 201 and the resulting voltage $U_6$ is introduced into a network 205 whose output voltage $U_7$ remains zero as long as voltage $U_6$ is negative and proportional to $U_6$ in the opposite case. If needed, a power amplifier 206 makes it possible to process voltage $U_8$ for controlling the delivery pressure of hydraulic generating unit 1.

Therefore, it can be seen that for a magnitude of torque applied to the steering wheel, represented by voltage $U_5$, the control voltage of the delivery pressure of the hydraulic pump, represented by $U_8$ or $U_7$, will be smaller the higher the speed of the vehicle. It is conceivable that beyond a certain speed, there is no longer any boost.

This embodiment of the units making it possible to reduce the booster pressure when the speed of the vehicle increases, which is particularly economical in view of present technology, is not, however, the only one possible. Thus, voltages $U_3$ and $U_5$ could be introduced in a multiplier producing an output voltage, supplied to power amplifier 206, proportional to the product of voltages $U_3$ and $U_5$, this voltage $U_3$ then being inversely proportional to the speed of the vehicle.

According to a first type of applied torque sensor, voltage $U_4$ remains zero as long as a minimal torque is not exceeded.

Voltage $U_4$ produced by comparator 202 is also introduced at the input of a high-gain amplifier 207 whose output voltage $U_9$ is equal to its saturation value. This voltage is applied to the inputs of two networks 208 and 209, the first supplying an output voltage only for positive values of $U_9$, the second only for negative values.

Voltage $U_7$, amplified by all-or-nothing amplifier 212 is applied to two AND logical units with two inputs indicated respectively as 213 and 214, the voltages applied to the second inputs of these units being $U_{10}$ and $U_{11}$ respectively which are output voltages of networks 208, 209. Thus, unit 213 will supply an output voltage $U_{12}$ only if voltage $U_9$ is positive and the control instruction of the delivery pressure is zero, and also for unit 214. Finally, these voltages $U_{12}$ and $U_{13}$ will feed power amplifiers 210 and 211 controlling regulators 51, 52.

It will be noted that additional oil temperature sensors can provide the desired corrections to one of output voltages $U_5$ or $U_7$ of networks 203 or 205.

We claim:

1. A hydraulic control device for a power steering system comprising:
    (a) a manually rotatable steering shaft;
    (b) a double-action hydraulic jack comprising a cylinder, a piston slidably disposed in said cylinder so as to divide said cylinder into a first chamber and a second chamber, and a rod extending from said piston through said chambers, one end of said rod being operatively connected to said steering shaft to convert rotary motion of said steering shaft into linear motion of said rod;
    (c) a torque sensor operatively connected to said steering shaft to sense torque applied manually thereto;
    (d) a constant-flow pump;
    (e) a first path of fluid communication leading from said constant-flow pump to said first chamber; and
    (f) a second path of fluid communication leading from said constant-flow pump to said second chamber, said hydraulic control device comprising:
    (g) an electrohydraulic distributor valve comprising:
        (i) a body having a bore therein and
        (ii) a slide valve slidably disposed in said bore, said slide valve having a first land at a first end of said slide valve, a second land in the middle of said slide valve, and a third land at a second end of said slide valve opposite to the first end thereof, said first and second lands being separated by a first annular groove and said second and third lands being separated by a second annular groove, said slide valve being shorter than said bore, whereby said bore is divided into a first control chamber fluid pressure in which acts on said first end of said slide valve, a second control chamber fluid pressure in which acts on said second end of said slide valve, a first annular valve chamber between said first and second lands, and a second annular valve chamber between said second and third lands;
    (h) a third path of fluid communication leading from said first path of fluid communication to said first annular valve chamber, said third path of fluid communication communicating with said first annular valve chamber at a point which ensures unobstructed communication over the entire range of movement of said slide valve;

(i) a fourth path of fluid communication leading from said second path of fluid communication to said second annular valve chamber, said fourth path of fluid communication communicating with said second annular valve chamber at a point which ensures unobstructed communication over the entire range of movement of said slide valve;

(j) a fifth path of fluid communication leading from said first annular valve chamber to tank, said fifth path of fluid communication communicating with said first annular valve chamber at a point such that communication is unobstructed when said slide valve is in its null position and when said slide valve moves from its null position in a first direction but is progressively throttled when said slide valve moves from its null position in a second direction opposite to said first direction;

(k) a sixth path of fluid communication leading from said second annular valve chamber to tank, said sixth path of fluid communication communicating with said second annular valve chamber at a point such that communication is unobstructed when said slide valve is in its null position and when said slide valve moves from its null position in said second direction but is progressively throttled when said slide valve moves from its null position in said first direction;

(l) a seventh path of fluid communication communicating control pressure which is a function of the pressure in said first path of fluid communication to said first control chamber;

(m) an eighth path of fluid communication communicating control pressure which is a function of the pressure in said second path of fluid communication to said second control chamber;

(n) a ninth path of fluid communication containing a first variable orifice communicating said seventh path of fluid communication to tank;

(o) a tenth path of fluid communication containing a second variable orifice communicating said eighth path of fluid communication to tank;

(p) a performance sensor; and (q) an electronic processing control, said electronic processing control having inputs from said torque sensor and said performance sensor and outputs to said first and second variable orifices, whereby:

(r) when said first and second variable orifices are closed, said slide valve is maintained in its null position by balanced control pressures in said first and second control chambers, said third and fifth paths of fluid communication are unobstructedly communicated to tank through said first annular valve chamber, and said fourth and sixth paths of fluid communication are unobstructedly communicated to tank through said second annular valve chamber;

(s) when said first variable orifice is opened while said second variable orifice remains closed, the control pressure in said first control chamber is reduced, causing the control pressure in said second control chamber to move said valve slide in said second direction, throttling said fifth path of fluid communication and thereby boosting pressure in said first chamber; and (t) when said second variable orifice is opened while said first variable orifice remains closed, the control pressure in said second control chamber is reduced, causing the control pressure in said first control chamber to move said valve slide in said first direction, throttling said sixth path of fluid communication and thereby boosting the pressure in said second chamber.

2. A hydraulic control device as recited in claim 1 wherein said performance sensor senses the speed of the vehicle in which the control device is mounted.

* * * * *